R. P. JENNINGS.
HOPPER.
APPLICATION FILED MAY 29, 1914.

1,111,070.

Patented Sept. 22, 1914.
2 SHEETS—SHEET 1.

Witnesses:
Leonard A. Powell.
Herman R. Hoffman

Inventor:
Richard P. Jennings,
by his attorney,
Charles V. Goding.

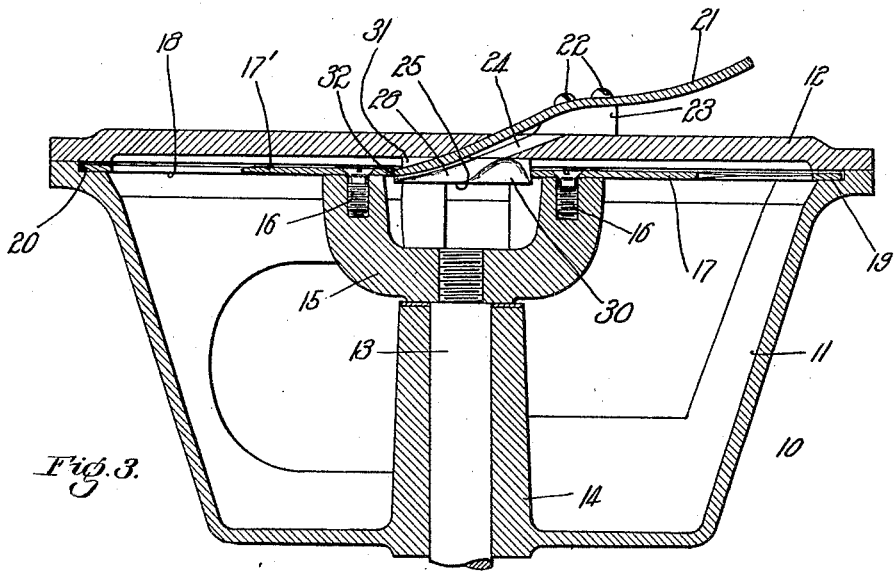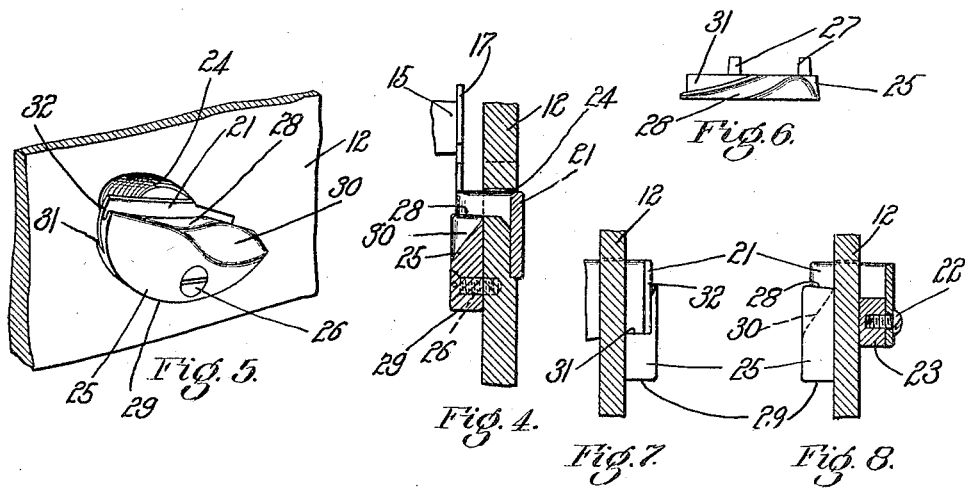

UNITED STATES PATENT OFFICE.

RICHARD P. JENNINGS, OF SOMERVILLE, MASSACHUSETTS, ASSIGNOR TO AMERICAN LACING HOOK CO., A CORPORATION OF NEW JERSEY.

HOPPER.

1,111,070.

Specification of Letters Patent. Patented Sept. 22, 1914.

Application filed May 29, 1914. Serial No. 841,934.

*To all whom it may concern:*

Be it known that I, RICHARD P. JENNINGS, a citizen of the United States, residing at Somerville, in the county of Middlesex and State of Massachusetts, have invented new and useful Improvements in Hoppers, of which the following is a specification.

This invention relates to an improved hopper for separating and feeding lacing hooks and like articles to a raceway from which they are fed to a machine to be automatically inserted in the work.

The hopper is of that class in which a rotary picker is utilized to pick up the hooks from the bottom of a receptacle and to deliver these hooks to a raceway from the inner ends of the blades (of which there are a plurality) on said picker plate, the lacing hooks passing from the inner ends of the blades onto the raceway, which raceway projects into the interior of the receptacle for the lacing hooks from one end thereof and adjacent to the central portion. In hoppers of this class difficulty has been encountered in the lacing hooks becoming jammed between the ends of the picker blades and the upper end of the raceway, thus jamming the lacing hooks and oftentimes causing breakage in the machine and this is particularly liable to happen where the picker plate is rotated comparatively rapidly.

The object of this invention is to overcome this difficulty and the invention consists, primarily, in a peculiarly shaped guard placed within the inner ends of the picker plate blades adjacent to the upper end of the raceway and within the receptacle for the lacing hooks.

The invention further consists in the combination and arrangement of parts set forth in the following specification and particularly pointed out in the claims.

Figure 1:
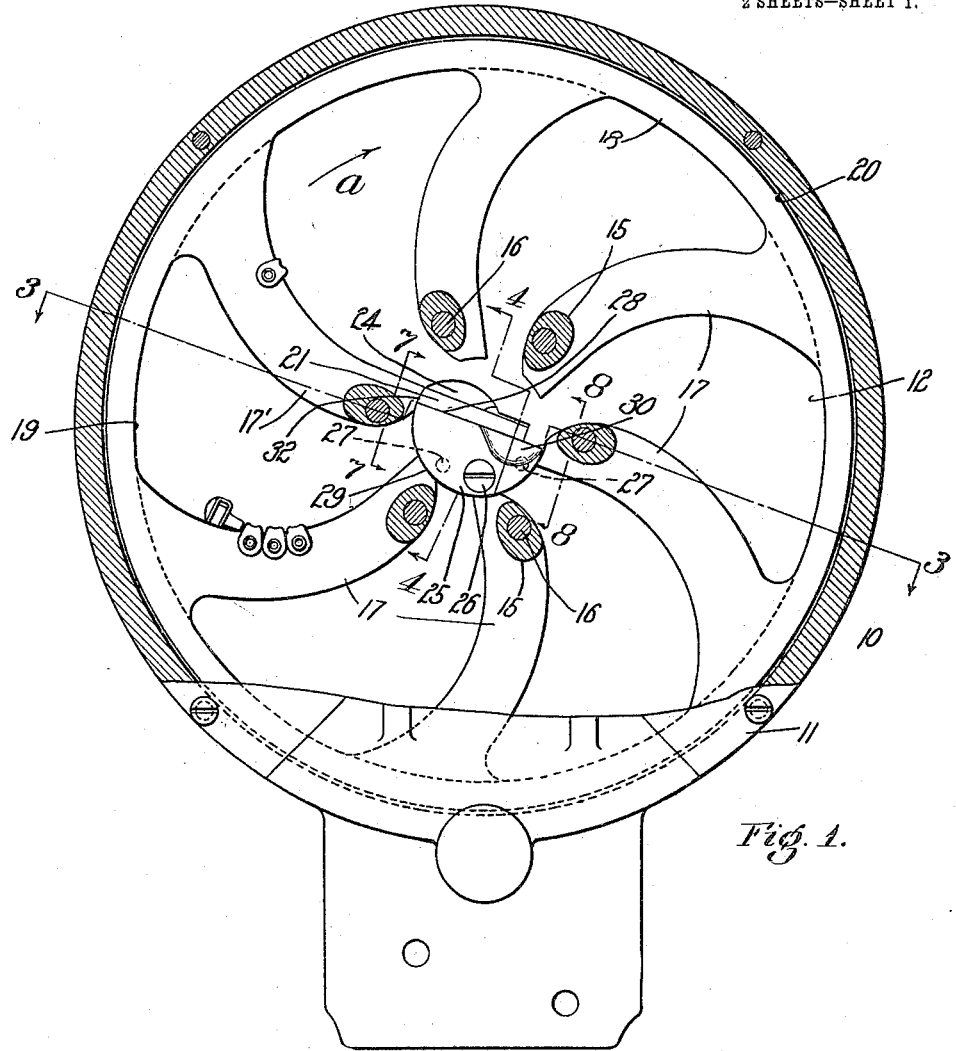
Figure 2:
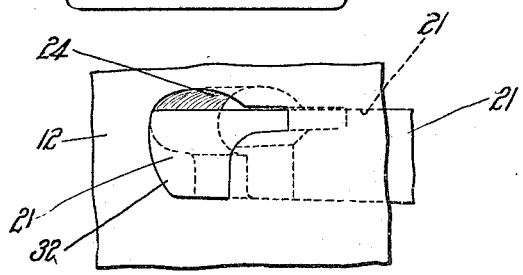

Referring to the drawings: Figure 1 is a section elevation of the hopper mechanism with the picker plate and the upper end of the raceway shown in elevation, the receptacle for the lacing hooks being shown broken away and partly in section. Fig. 2 is a detail elevation of a portion of the cover end of the lacing hook receptacle, with the upper end of the raceway shown in connection therewith illustrating the form of outlet passage through which the lacing hooks pass as they travel along the raceway and out of the interior of the receptacle. Fig. 3 is a sectional plan taken on line 3—3 of Fig. 1. Fig. 4 is a detail sectional elevation taken on line 4—4 of Fig. 1. Fig. 5 is a perspective view of the raceway guard showing the same fastened to a portion of the cover or end plate of the hopper and the upper end of the raceway in connection therewith. Fig. 6 is a plan view of the raceway guard. Fig. 7 is a detail sectional elevation taken on line 7—7 of Fig. 1. Fig. 8 is a detail sectional elevation taken on line 8—8 of Fig. 1.

Like numerals refer to like parts throughout the several views of the drawings.

In the drawings, 10 is the hopper consisting of a receptacle 11 with a cover 12 fast thereto. A shaft 13 is rotatably mounted in a bearing 14 in said receptacle 11 and has fastened to its inner end a hub 15 to which is fastened by screws 16 the blades 17 of a rotary picker plate 18. The blades 17 are joined together by a rim 19 which runs in an annular groove 20 formed in the face of the receptacle 11 adjacent to the cover 12.

A raceway 21 is fastened by screws 22 to a boss 23 on the cover 12 and its upper end projects through a passageway 24 in the central portion of said cover 12, the upper end of said raceway extending into the interior of the receptacle 11 in alinement with the blades 17 of the picker plate 18.

A raceway guard 25 is fastened to the inside of the cover 12 by a screw 26 and is accurately located in position relatively to the upper end of the raceway 21 by dowel pins 27. Said guard 25 has an inclined upper edge 28 extending from a point adjacent the upper end of the raceway 21 downwardly and preferably substantially parallel to the upper edge of said raceway 21. The lower edge 29 of said guard plate 25 is formed upon a curve concentric with the picker plate 18, the whole plate forming a semi-circular member the lower edge of which is concentric with the picker plate and in close juxtaposition with the inner ends of the blades 17 as they pass around underneath said guard plate. The semi-circular lower edge 29 of the guard plate 25 projects at one end thereof adjacent to and beneath the upper end of said raceway, while said upper end of the raceway is formed on a curve concentric with said picker plate and forms, in effect, a continuation of said semi-circular lower edge of the raceway guard. The raceway guard further has formed in its inner face a depression 30 which is inclined laterally from said upper edge 28 toward the interior of the receptacle 11. Said guard 25 has in its rear face a notch 31 into which the upper end of the raceway 21 projects, said guard thus forming a support for the free upper end of the raceway 21 which holds it firmly in position relatively to the cover 12. The upper edge 28 of the guard is located below the upper edge of the raceway at its upper end and said upper edge projects laterally inward from the inner face of said raceway adjacent to the upper end of said raceway.

The general operation of the device hereinbefore specifically described is as follows: The lacing hooks are placed in mass in the receptacle 11 and as the picker blades pass through said mass at the bottom of the receptacle 11, the lacing hooks are picked up on the blades and slide along said blades during the rotation of the picker plate until they come one after another to the position occupied by the blade 17' (Fig. 1). The lacing hooks then slide off of this blade 17' and onto the upper end of the raceway 21. Then, if they are located properly and slide freely, they pass down the raceway 21 through the passageway 24 and out of the receptacle 11 into the machine where they are set in the upper of a boot or shoe in a manner well known to those skilled in this art. If, however, some of the lacing hooks do not slide onto the raceway 21 but pass from the blade 17', as the picker plate is rotated in the direction of the arrow $a$ (Fig. 1), over the upper end of said raceway, they will fall on the upper edge 28 of the guard plate 25 and will be guided by said upper edge 28 of said guard plate downwardly toward the interior of the receptacle 11 and will be guided sideways or laterally into the interior of said receptacle when they arrive at the laterally inclined depression 30 in said guard plate 25.

It will be seen that it will be impossible for a lacing hook to be caught between the inner end of any one of the blades and the end of the raceway for the reason that as said blades pass upwardly their inner ends are in contact with the lower edge 29 of the guard plate 25 and so remain until they pass from the guard plate along the upper end 32 of said raceway 21. This upper end 32 is also concentric with the picker plate 18, thus making a continuous surface along which the inner ends of the blades 17 travel until they come to the position occupied by the blade 17', when the hooks slide off of said blade and onto the raceway, as hereinbefore described. After the blades pass beyond and above the raceway 21 there is no possibility of their jamming the lacing hooks until they again encounter the semi-circular lower edge 29 of the guard plate 25 and by this time the edges of the blades along which the lacing hooks slide have become inverted, as seen at the right of the guard plate (Fig. 1), so that all the lacing hooks have by that time dropped off the blades and have been returned to the interior of the receptacle 11. Thus there is an open space through which the inner ends of the blades travel from the time that they leave the upper end 32 of the raceway until they contact with the lower edge of the guard 25 at the lower end of the edge 28 of said guard and inclined upper edge 28 of said guard and all hooks which drop from the blades 17 during this half rotation of the picker plate are diverted by the inclined upper edge 28 and by the laterally inclined depression 30 of said guard plate into the interior of the receptacle 11.

I claim:

1. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard for said raceway having an inclined upper edge and a lower edge concentric with said picker plate and projecting at one end thereof adjacent to and beneath the upper end of said raceway.

2. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard for said raceway having an inclined upper edge and a lower edge concentric with said picker plate projecting at one end thereof adjacent to and beneath the upper end of said raceway, the upper end of said raceway being formed on a curve concentric with said picker plate and forming a continuation of said lower edge of said guard.

3. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard for said raceway having an inclined upper edge and a lower edge concentric with said picker plate and projecting at one end thereof adjacent to and beneath the upper end of said raceway, said guard having a depression in its inner face inclined laterally from said outer edge toward the interior of said receptacle.

4. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard for said raceway having the lower edge thereof concentric with said picker plate and projecting at one end thereof adjacent to and beneath the upper end of said raceway.

5. A hopper having, in combination, a receptacle for hooks and the like, a raceway, the upper end thereof inclined at an angle to a horizontal plane and projecting into one end of said receptacle adjacent to the center of said end, a rotary picker plate with a plurality of blades arranged to deliver hooks from their inner ends to said upper ends of said raceway and a guard for said raceway having an inclined upper edge and having a notch in its rear face into which said upper end of said raceway projects, the lower edge of said guard being concentric with said picker plate and projecting at one end thereof adjacent to and beneath the upper end of said raceway.

6. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard having a semi-circular lower edge concentric with said picker plate and terminating at one end thereof beneath and adjacent to the upper end of said raceway, said upper end forming a continuation of said lower edge.

7. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard having a semi-circular lower edge concentric with said picker plate and terminating at one end thereof beneath and adjacent to the upper end of said raceway, said upper end forming a continuation of said lower edge, said guard having an upper edge inclined downwardly from the upper end of said raceway.

8. A hopper having, in combination, a receptacle for hooks and the like, a raceway, th upper end thereof inclined at an angle to a horizontal plane and projecting into said receptacle, a rotary picker plate with a plurality of blades arranged to deliver hooks from their inner ends to said upper end of said raceway and a guard having a semi-circular lower edge concentric with said picker plate and terminating at one end thereof beneath and adjacent to the upper end of said raceway, said upper end forming a continuation of said lower edge, said guard having an upper edge inclined downwardly from the upper end of said raceway, said upper edge of said guard being located below the upper edge of said raceway at its upper end.

9. A hopper having, in combination, a receptacle for hooks and the like, a raceway, the upper end thereof inclined at an angle to a horizontal plane and projecting into said receptacle, a rotary picker plate with a plurality of blades arranged to deliver hooks from their inner ends to said upper end of said raceway and a guard having a semi-circular lower edge concentric with said picker plate and terminating at one end thereof beneath and adjacent to the upper end of said raceway, said upper end forming a continuation of said lower edge, said guard having an upper edge inclined downwardly from the upper end of said raceway, said upper edge of said guard being located below the upper edge of said raceway at its upper end and projecting laterally inward from the inner face of said raceway adjacent to the upper end of said raceway.

In testimony whereof I have hereunto set my hand in presence of two subscribing witnesses.

RICHARD P. JENNINGS.

Witnesses:
CHARLES L. GOODING,
SYDNEY E. TAFT.

Copies of this patent may be obtained for five cents each, by addressing the "Commissioner of Patents, Washington, D. C."